United States Patent
Boss et al.

(10) Patent No.: US 10,990,926 B2
(45) Date of Patent: Apr. 27, 2021

(54) MANAGEMENT OF RESOURCES IN VIEW OF BUSINESS GOALS

(71) Applicant: International Business Machines Corporation, Armonk, NY (US)

(72) Inventors: Gregory J. Boss, Saginaw, MI (US); Rick A. Hamilton, II, Charlottesville, VA (US); Ashish Patel, Edmonton (CA); Randy A. Rendahl, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1306 days.

(21) Appl. No.: 14/926,024

(22) Filed: Oct. 29, 2015

(65) Prior Publication Data

US 2017/0124513 A1    May 4, 2017

(51) Int. Cl.
*G06Q 10/10*    (2012.01)
*G06Q 10/06*    (2012.01)

(52) U.S. Cl.
CPC ..... *G06Q 10/103* (2013.01); *G06Q 10/06313* (2013.01)

(58) Field of Classification Search
None
See application file for complete search history.

(56) References Cited

U.S. PATENT DOCUMENTS

| | | | | |
|---|---|---|---|---|
| 7,137,119 B1 * | 11/2006 | Sankaranarayan | ... | G06F 9/5011 718/103 |
| 7,159,184 B2 * | 1/2007 | Ullah | ..................... | G06F 9/5027 711/170 |
| 8,195,800 B2 * | 6/2012 | Tameshige | ............ | G06F 9/5011 705/1.1 |
| 8,205,205 B2 * | 6/2012 | Franke | .................... | G06F 9/505 718/103 |

(Continued)

FOREIGN PATENT DOCUMENTS

| | | | | | |
|---|---|---|---|---|---|
| WO | WO-2011025668 A1 * | 3/2011 | ........... | G06F 9/5072 |
| WO | WO-2012000850 A1 * | 1/2012 | ........... | G06F 9/5005 |

(Continued)

OTHER PUBLICATIONS

Anuradha, V. P., and D. Sumathi. "A survey on resource allocation strategies in cloud computing." International Conference on Information Communication and Embedded Systems (ICICES2014). IEEE, 2014. (Year: 2014).*

(Continued)

*Primary Examiner* — Matthew S Gart
*Assistant Examiner* — Derick J Holzmacher
(74) *Attorney, Agent, or Firm* — Steven M. Bouknight (57) ABSTRACT

A computer creates a prioritization list of a set of project functions, wherein each project function is associated with a priority level and an amount of resources. The computer detects a request, wherein the request includes a request to do one or more of alter one or more project functions of the set of project functions, add one or more project functions to (Continued)

the set of project functions, and remove one or more project functions from the set of project functions. The computer determines whether to allow the request based on at least on a comparison to the prioritization list.

20 Claims, 5 Drawing Sheets

(56) References Cited

U.S. PATENT DOCUMENTS

| | | | | |
|---|---|---|---|---|
| 8,495,648 B1* | 7/2013 | Brandwine | ............ | H04L 43/04 718/104 |
| 8,533,103 B1* | 9/2013 | Certain | ............ | G06Q 10/06 705/37 |
| 8,612,330 B1* | 12/2013 | Certain | ............ | G06F 9/50 705/37 |
| 8,694,400 B1* | 4/2014 | Certain | ............ | G06Q 30/08 705/35 |
| 8,706,798 B1* | 4/2014 | Suchter | ............ | H04L 43/0876 709/202 |
| 8,756,324 B2 | 6/2014 | Polla et al. | | |
| 8,782,243 B2* | 7/2014 | Lee | ............ | H04W 4/60 709/226 |
| 8,949,429 B1* | 2/2015 | Chuang | ............ | G06F 9/50 709/224 |
| 8,966,030 B1* | 2/2015 | Sirota | ............ | G06F 9/5061 709/221 |
| 9,720,736 B2* | 8/2017 | Kochunni | ............ | G06F 3/0659 |
| 9,798,635 B2* | 10/2017 | Harper | ............ | G06F 9/5005 |
| 2005/0039183 A1* | 2/2005 | Romero | ............ | G06F 9/5061 718/100 |
| 2007/0162673 A1* | 7/2007 | Garg | ............ | H04N 1/00915 710/240 |
| 2007/0234115 A1* | 10/2007 | Saika | ............ | G06F 11/2028 714/13 |
| 2007/0234365 A1* | 10/2007 | Savit | ............ | G06F 9/505 718/104 |
| 2009/0164356 A1 | 6/2009 | Bakman | | |
| 2009/0210527 A1* | 8/2009 | Kawato | ............ | G06F 9/45558 709/224 |
| 2010/0027420 A1* | 2/2010 | Smith | ............ | H04L 47/70 370/235 |
| 2010/0229171 A1* | 9/2010 | Yoshimura | ............ | G06F 9/455 718/1 |
| 2011/0077997 A1 | 3/2011 | Agarwala et al. | | |
| 2011/0225300 A1* | 9/2011 | Kaneki | ............ | G06F 9/5088 709/226 |
| 2011/0231899 A1 | 9/2011 | Puller et al. | | |
| 2011/0252137 A1 | 10/2011 | Stienhans et al. | | |
| 2012/0131591 A1* | 5/2012 | Moorthi | ............ | H04L 67/10 718/104 |
| 2012/0144041 A1* | 6/2012 | Lee | ............ | H04W 4/60 709/226 |
| 2012/0167108 A1* | 6/2012 | Bowers | ............ | G06F 9/5072 718/103 |
| 2012/0192186 A1* | 7/2012 | Bornstein | ............ | G06F 9/5011 718/100 |
| 2012/0290725 A1* | 11/2012 | Podila | ............ | G06F 9/5011 709/226 |
| 2012/0304169 A1* | 11/2012 | Anderson | ............ | G06F 9/45533 718/1 |
| 2013/0080641 A1* | 3/2013 | Lui | ............ | H04L 43/045 709/226 |
| 2013/0111468 A1* | 5/2013 | Davis | ............ | G06F 9/5077 718/1 |
| 2013/0185433 A1* | 7/2013 | Zhu | ............ | H04L 43/0882 709/226 |
| 2013/0204983 A1* | 8/2013 | Kenkre | ............ | G06F 9/50 709/220 |
| 2013/0263117 A1* | 10/2013 | Konik | ............ | G06F 9/5077 718/1 |
| 2013/0304903 A1* | 11/2013 | Mick | ............ | H04L 67/10 709/224 |
| 2014/0007097 A1* | 1/2014 | Chin | ............ | G06F 9/5077 718/1 |
| 2014/0007121 A1* | 1/2014 | Caufield | ............ | G06F 9/505 718/103 |
| 2014/0032761 A1* | 1/2014 | Beveridge | ............ | G06F 9/45533 709/226 |
| 2014/0068056 A1* | 3/2014 | Simitsis | ............ | G06F 9/5011 709/224 |
| 2014/0068609 A1* | 3/2014 | Breitgand | ............ | G06F 9/45533 718/1 |
| 2014/0101005 A1 | 4/2014 | Baset et al. | | |
| 2014/0176583 A1* | 6/2014 | Abiezzi | ............ | G06F 9/45533 345/522 |
| 2014/0181806 A1* | 6/2014 | Abiezzi | ............ | G06F 9/5044 718/1 |
| 2014/0214755 A1 | 7/2014 | Aguiar et al. | | |
| 2014/0289412 A1* | 9/2014 | Doddavula | ......... | H04L 41/5003 709/226 |

FOREIGN PATENT DOCUMENTS

| | | | |
|---|---|---|---|
| WO | WO-2014210443 A1 * | 12/2014 | ............ G06F 9/5066 |
| WO | WO-2015009318 A1 * | 1/2015 | ......... G06F 9/45558 |

OTHER PUBLICATIONS

Student, U. G. "Dynamic resource allocation scheme in cloud computing." Procedia Computer Science 47 (2015): 30-36. (Year: 2015).*
Pawar, Chandrashekhar S., and Rajnikant B. Wagh. "Priority based dynamic resource allocation in cloud computing." 2012 International Symposium on Cloud and Services Computing. IEEE, 2012. (Year: 2012).*
Gouda, K. C., T. V. Radhika, and M. Akshatha. "Priority based resource allocation model for cloud computing." International Journal of Science, Engineering and Technology Research (IJSETR) 2.1 (2013): 215-219. (Year: 2013).*
Acharya et al., "Cloud Computing Architectures and Dynamic Provisioning Mechanisms," 2013 International Conference on Green Computing, Communication and Conservation of Energy (ICGCE), Dec. 12-14, 2013, pp. 798-804, © IEEE 2013.
Dam et al., "Genetic Algorithm and Gravitational Emulation Based Hybrid Load Balancing Strategy in Cloud Computing," 2015 Third International Conference on Computer, Communication, Control and Information Technology (C3IT), Feb. 7-8, 2015, © 2015 IEEE, pp. 1-7.
Rajarathinam et al., "Power-Aware Meta Scheduler with Non-linear Workload Predictions for Adaptive Virtual Machine Provisioning," Intelligent Computing Theory, 10th International Conference, ICIC 2014, vol. 8588 of the Series Lecture Notes in Computer Science, © Springer International Publishing Switzerland 2014, pp. 826-837.
IBM, "Method of creating a componentized architecture for unifying resource sharing scenarios in Cloud Computing environment", An IP.com Prior Art Database Technical Disclosure, IP.com No. 000193146, Feb. 11, 2010, pp. 1-14.
Disclosed Anonymously, "System and Method for a Cloud Computing Governance Abstraction Layer," An IP.com Prior Art Database Technical Disclosure, IP.com No. 000214436, Jan. 27, 2012, pp. 1-7.
Mell et al., "The Nist Definition of Cloud Computing," National Institute of Standards and Technology, U.S. Department of Commerce, Special Publication 800-145, Sep. 2011, pp. 1-7.

* cited by examiner

MANAGEMENT OF RESOURCES IN VIEW OF BUSINESS GOALS

TECHNICAL FIELD

The present invention relates to management of resources, and more particularly to the management of resources in view of business goals.

BACKGROUND

Companies are utilizing the cloud more and more to meet their data storage, project function, and data backup needs. As companies adopt larger amounts of cloud capabilities for test, development, and production workloads, controlling the associated expenses becomes increasingly more complex. Part of this complexity is due to the unbounded nature of the resources that may be consumed by the various projects. It is important for companies to keep in mind how the resources consumed by various projects affects the overall budget of the company. A brief discussion of the prior art is included below.

US Patent Publication US 2011/0231899 (Pulier et al.), discloses a system that provides a cloud-computing service from a cloud-computing environment which may comprise a management module configured to manage a cloud-computing resource as a cloud computing service, wherein the cloud-computing service performs a computer workload; an adapter configured to connect to the cloud computing resource to the system and translate a management instruction received from the management module into a proprietary cloud application program interface call for the cloud-computing resource; a cloud service bus configured to route the management instruction from the management module to the adapter; a consumption module configured to allow a user to subscribe the cloud-computing service; a planning module configured to plan the cloud-computing service; and a build module configured to build the cloud-computing service from the cloud-computing resource and publish the cloud-computing service to the consumption module.

US Patent Publication US 2011/0252137A1 (Steinhans et al.) discloses a method comprising configuration information for creating one or more software servers as images on a cloud computing system, specifying a processing load threshold, and continuously monitoring a processing load on one or more software servers. If the monitored load exceeds the processing load threshold, a request to the cloud computing system may be generated to instantiate an instance of one of said images. The method further includes creating a server instance on the cloud in response to the request, distributing the processing load across the one or more servers and the server instance, and monitoring the processing load on the one or more servers and the server instance.

US Patent Publication 2014/0101005 A1 (Baset et al.) discloses a method for providing a cloud-based service to an enterprise comprising a plurality of members including receiving at least a portion of a policy a first user within the enterprise, where the policy defines a limit on usage of the cloud-based service by at least some of the plurality of members, receiving a request for the cloud-based service from a second user associated with one of the plurality of members, and automatically responding to the request in accordance with the policy.

The prior art does not address a need for managing and effectively allocating computing resources based on an analysis of the characteristics of the computing resources.

SUMMARY

The present invention provides a method, system, and computer program product for managing resources. A computer creates a prioritization list of a set of project functions, wherein each project function is associated with a priority level and an amount of resources. The computer detects a request, wherein the request includes a request to do one or more of alter one or more project functions of the set of project functions, add one or more project functions to the set of project functions, and remove one or more project functions from the set of project functions. The computer determines whether to allow the request based on at least on a comparison to the prioritization list.

An embodiment of the present invention provides the advantage of determining whether to allow a request for resources based at least on a comparison to a prioritization list of project functions created based on a priority level and an amount of resources associated with each project function.

Optionally, an embodiment of the present invention may further include the following: the computer may additionally determine whether one or more project functions of the set of project functions have an associated priority level that is lower than a priority level associated with the request, and determine whether at least one of the one or more project functions have any associated throwaway fees, wherein throwaway fees include one or more of startup fees and shutdown fees. Responsive to determining that the one or more project functions have an associated priority level that is lower than a priority level associated with the request, and determining that at least one of the one or more project functions do not have any associated throwaway fees, the computer determines whether the at least one of the one or more project functions have an associated amount of resources that is at least equal to an amount of resources associated with the request. Responsive to determining that the at least one of the one or more project functions have an associated amount of resources that is at least equal to an amount of resources associated with the request, the computer reduces the amount of resources associated with the at least one of the one or more project functions by an amount equal to the amount of resources associated with the request, and allows the request.

An embodiment of the present invention further provides the advantages of determining whether to allow a request based on determining that one or more project functions have an associated priority level that is lower than a priority level associated with the request, and determining that at least one of the one or more project functions do not have any throwaway fees.

Furthermore, an embodiment of the present invention may further include the following: based on determining that the one or more project functions have an associated priority level that is lower than a priority level associated with the request, and determining that at least one of the one or more project functions do not have any associated throwaway fees, the computer may additionally determine whether the at least one of the one or more project functions have an associated amount of resources that is at least equal to an amount of resources associated with the request. Responsive to determining that the at least one of the one or more project functions have an associated amount of resources that is not at least equal to an amount of resources associated with the request: the computer determines a group of project functions of the one or more project functions based on priority level and minimization of throwaway fees, wherein the group of project functions includes the at least one of the one or more project functions; and the computer reduces an amount of resources associated with the group of project functions by an amount equal to the amount of resources associated with the request, and allows the request.

An embodiment of the present invention further provides the advantages of responsive to determining that at least one of the one or more project functions have an associated amount of resources that is not at least equal to an amount of resources associated with the request: the computer determining a group of project functions of the one or more project functions based on a priority level and minimization of throwaway fees, the computer reducing an amount of resources associated with the group of project functions by an amount of resources associated with the request, and allowing the request.

DETAILED DESCRIPTION

Embodiments of the present invention will now be described in detail with reference to the accompanying Figures.

The current state of the prior art does not address a need for managing and effectively allocating computing resources based on an analysis of the characteristics of the computing resources. An embodiment of the present invention provides the advantage of determining whether to allow a request for computing resources (such as RAM, persistent storage, etc) based on at least a comparison to a prioritization list of project functions created based on a priority level and an amount of computing resources associated with each project function.

An embodiment of the present invention further provides the advantages of determining whether to allow a request based on determining that one or more project functions have an associated priority level that is lower than a priority level associated with the request, and determining that at least one of the one or more project functions do not have any throwaway fees. An embodiment of the present invention further provides the advantages of responsive to determining that at least one of the one or more project functions have an associated amount of computing resources that is not at least equal to an amount of computing resources associated with the request: the computer determining a group of project functions of the one or more project functions based on a priority level and minimization of throwaway fees, the computer reducing an amount of computing resources associated with the group of project functions by an amount of computing resources associated with the request, and allowing the request.

Figure 1:
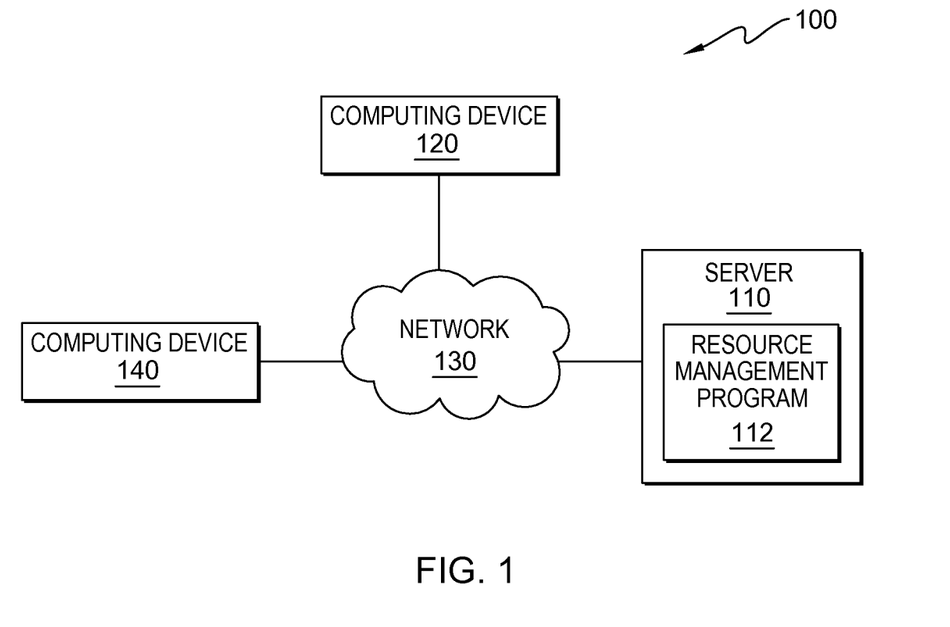
FIG. 1 illustrates a resource management system, in accordance with an embodiment of the invention.

FIG. 1 illustrates resource management system 100, in accordance with an embodiment of the invention. In an exemplary embodiment, resource management system 100 includes server 110, computing device 120, and computing device 140 all interconnected via network 130.

In the exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between server 110, computing device 120, and computing device 140.

Computing device 120 may be a desktop computer, a notebook, a laptop computer, a tablet computer, a handheld device, a smart-phone, a thin client, or any other electronic device or computing system capable of receiving and sending data to and from other computing devices, such as computing device 140 and server 110, via a network, such as network 130. Although not shown, optionally, computing device 120 can comprise a cluster of web devices executing the same software to collectively process requests.

Computing device 140 may be a desktop computer, a notebook, a laptop computer, a tablet computer, a handheld device, a smart-phone, a thin client, or any other electronic device or computing system capable of receiving and sending data to and from other computing devices, such as computing device 120 and server 110, via a network, such as network 130. Although not shown, optionally, computing device 140 can comprise a cluster of web devices executing the same software to collectively process requests.

Server 110 includes resource management program 112. Server 110 may be a desktop computer, a notebook, a laptop computer, a tablet computer, a handheld device, a smart-phone, a thin client, or any other electronic device or computing system capable of receiving and sending data to and from other computing devices, such as computing device 120 and computing device 140, via a network, such as network 130. Although not shown, optionally, server 110 can comprise a cluster of web devices executing the same software to collectively process requests. Server 110 is described in more detail with reference to FIG. 3.

In the example embodiment, resource management program 112 is a program capable of creating a prioritized list of project functions utilizing the resources of resource management system 100 based on factors such as resource and project priority. In addition, resource management program 112 is capable of identifying a potential change to the allocation of resources within resource management system 100, and determining whether to change the current resources allocated in order to allow for the potential change to take place. Furthermore, in the example embodiment, if the current resources allocated are to be changed, resource management program 112 is capable of analyzing the prioritized list of project functions in order to determine which resources should be changed based on prioritization of the project functions and by analysis of the cost savings associated with changing each project function. The operations and functions of resource management program 112 are described in more detail with reference to FIG. 2.

Figure 2:
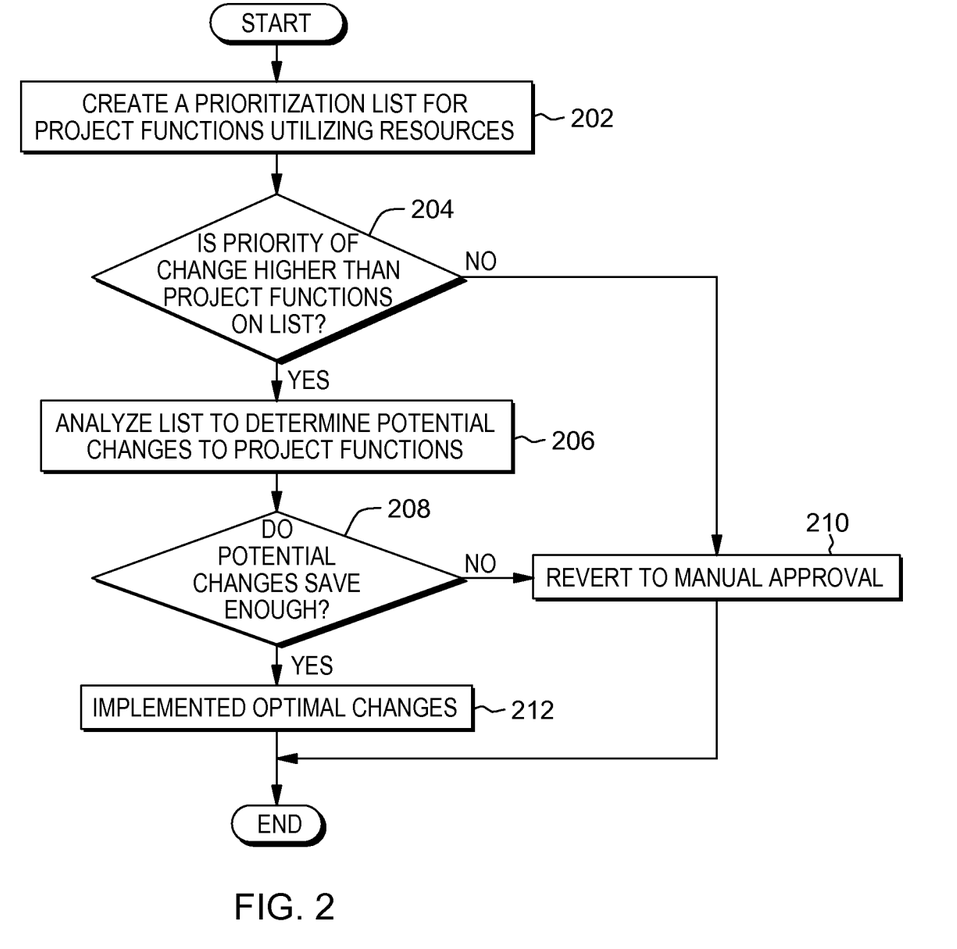
FIG. 2 is a flowchart illustrating the operations of the resource management program of FIG. 1, in accordance with an embodiment of the invention.

FIG. 2 is a flowchart illustrating the operations of resource management program 112 in determining whether to change the allocation structure of current resources in order to allow for a resource request, in accordance with an embodiment of the invention. In the example embodiment, resource management program 112 creates a prioritization list for the project functions utilizing the resources of resource management system 100 (step 202). In the example embodiment, resource management system 100 includes server 110, computing device 120, and computing device 140, however, in other embodiments, resource management system 100 may include additional resources, such as additional computing devices and storage devices. In the example embodiment, the prioritization list includes an amount of resources being utilized by a project function (such as a percentage of available random access memory (RAM) being utilized by a specific function), a prioritization number associated with the project function, and any associated fees (such as a reactivation fee or a shutdown fee). In other embodiments, the prioritization list may include additional information such as complications that may arise from stopping or halting the project function or changing the frequency of the project function, including any applicable cost considerations. For example, the prioritization list may include a project function "handling all user traffic" which may be assigned a level 1 priority with no associated fees, and a project function "system back-up", which is performed every 6 hours, may be assigned a level 2 priority with no associated fees, and a project function to maintain an active disaster recovery (DR) system on standby which may be assigned a level 3 priority but have an associated reactivation fee if removed/canceled. In addition, in the example embodiment, the prioritization list is created by resource management program 112 from information received via user input. For example, the user may input an overall budget, an overall resource system run rate (which may be less than 100% of the system capabilities), usage percentage ranges for resource management system 100 that are associated with automatic approval, usage percentage ranges that require manual approval to exceed, priority levels for each project function, any fees associated with each project function, and additional information that may be deemed relevant to the project functions and usage of resources of resource management system 100.

Resource management program 112 determines whether the priority level of a requested change to the allocation of resources is higher than at least one of the priority levels of the project functions on the prioritization list (decision 204). In the example embodiment, resource management program 112 identifies a request for a new project function to utilize a portion of the resources of resource management system 100 or a request detailing a change to a current project function, such as for the current project function to utilize a larger portion of the resources of resource management system 100. For example, resource management program 112 may identify a request for additional resources due to a sudden increase in demand from a customer running a typical 3-tier software as a service (SaaS) application. As stated above in the example above, "handling all user traffic" is assigned a level 1 priority, and therefore, resource management program 112 compares the priority level of the requested project function to the prioritization list and determines that the priority level of the requested project function is higher than at least one of the priority levels of the project functions on the prioritization list. In another example, resource management program 112 may identify a request for additional resources due to a request for a new project function that is assigned a level 3 priority. In this example, resource management program 112 may compare the priority level of the requested project function to the prioritization list and determine that the priority level of the requested project function is not higher than at least one of the priority levels of the project functions on the prioritization list.

If resource management program 112 determines that the priority level of a requested change to the allocation of resources is not higher than at least one of the priority levels of the project functions on the prioritization list (decision 204, "NO" branch), resource management program 112 prompts the user or an administrator to provide manual approval for the requested project function (step 210). If resource management program 112 determines that the priority level of a requested change to the allocation of resources is higher than at least one of the priority levels of the process on the prioritization list (decision 204, "YES" branch), resource management program 112 analyzes the prioritization list in order to determine potential changes that can be made to the project functions on the prioritization list in order to reduce the amount of resources the current project functions are utilizing (step 206). In the example embodiment, resource management program 112 analyzes project functions that have an associated priority level that is lower than the project function associated with the requested change. In the analysis, resource management program 112 may take into account associated priority levels, fees (such as reactivation and shutdown fees), the amount of resources utilized by each project function, and additional attributes of each project function. For example, if resource management program 112 may analyze project functions on the prioritization list that have a lower priority level than the project function associated with the requested change and identify a first project function "system back-up", which is performed every 6 hours, and assigned a level 2 priority with no associated fees. In addition, resource management program 112 may identify a second project function to maintain an active disaster recovery (DR) system on standby which may be assigned a level 3 priority but have an associated reactivation fee if removed/canceled. In this example, resource management program 112 analyzes each of these project functions including determining whether the resources saved will cover the resources needed for the requested change, and how cost-effective each option is.

Resource management program 112 determines whether the identified potential changes that can be made to the project functions reduce the usage of the resources in resource management system 100 enough to cover the resources needed for the requested change (decision 208). If resource management program 112 determines that the identified potential changes that can be made to the project functions reduce the usage of the resources in resource management system 100 are not enough to cover the resources needed for the request change (decision 208, "NO" branch), resource management program 112 prompts the user or an administrator to provide manual approval for the requested project function (step 210). If resource management program 112 determines that the identified potential changes that can be made to the project functions reduce the usage of the resources in resource management system 100 enough to cover the resources needed for the request change (decision 208, "YES" branch), resource management program 112 implements the optimal changes from the identified potential changes (step 212).

In the example embodiment, resource management program 112 identifies changes that can be made to the identified project functions/options that do not require any throwaway fees (such as shutdown fees or reactivation fees). If resource management program 112 determines that the identified project functions/options that do not require throwaway fees covers the resources needed for the requested change, resource management program 112 may proceed with the change (change to the identified project functions/options and allowing the requested change). If resource management program 112 determines that the identified project functions/options that do not require throwaway fees do not cover the resources needed for the requested change, resource management program 112 determines the project functions/options that do not require shutdown fees (and therefore may have some reactivation fees). If resource management program 112 determines that the project functions/options that do not require shutdown fees cover the resources needed for the requested change, resource management program 112 may proceed with the change (choosing options in order to minimize the reactivation fees). However, if resource management program 112 determines that the project functions/options that do not require shutdown fees do not cover the resources needed for the requested change, resource management program 112 determines the project functions/options that require the minimal amount of shutdown fees but still cover the resources needed for the requested change, and proceed with the change.

Furthermore, in the example embodiment, resource management program 112 may restrict authorization of a requested change if the request entails a significant amount of resources. In the example embodiment, resource management program 112 may delay approval of the request if the request entails a significant amount of resources (if the request is for 1 gigabyte of extra RAM, approval may take 60 seconds, however, approval may take 4 hours for 4 gigabytes) and/or may divvy out the request over time. For example, for a request of 1 gigabyte, resource management program 112 may allocate 500 megabytes initially, then another 500 megabytes an hour later, or in the case of a 4 gigabyte request, resource management program 112 may allocate 1 gigabyte immediately, then another gigabyte every 6 hours.

In addition, in the example embodiment, there may be limits on different priority project functions. For example, a low priority project function may be restricted from driving the run rate of resource management system 100 past 90% in order to reserve capacity if a high priority workload ramps up. Additionally, a high priority project function may have an associated setting that allows the budget/run rate to exceed 100% (for example, up to 110%), however, in such a case, resource management program 112 may send out appropriate notices to parties when the budget/run rate is exceeded. On the other hand, project functions may have an associated setting that details a minimum that it may not be reduced below in order to assure business continuity where needed, even in low priority project functions.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
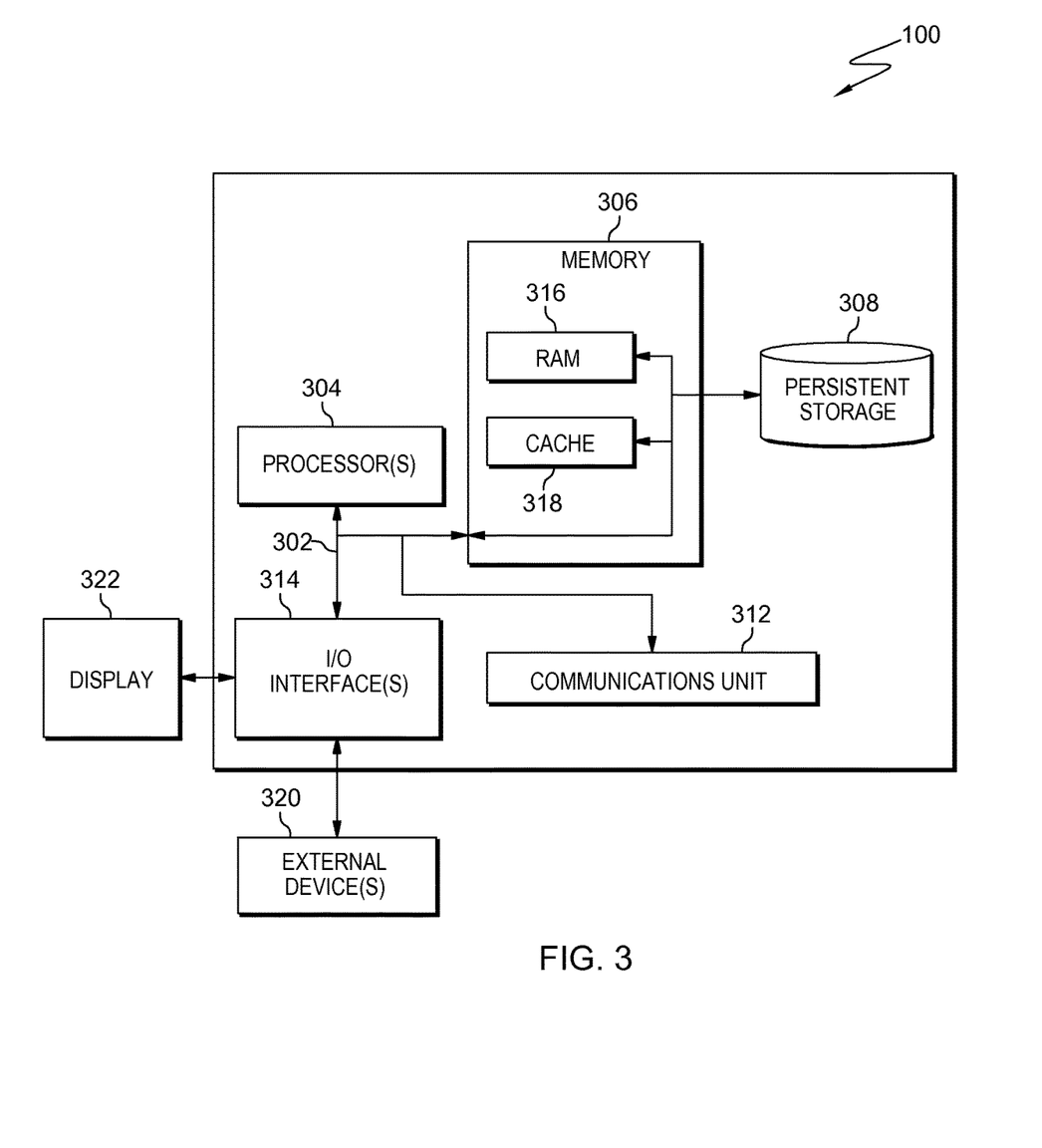
FIG. 3 is a block diagram depicting the hardware components of the resource management system of FIG. 1, in accordance with an embodiment of the invention.

FIG. 3 depicts a block diagram of components of server 110, computing device 120, and computing device 140 of resource management system 100 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 110, computing device 120, and computing device 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

Resource management program 112 in server 110 may be stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Resource management program 112 in server 110 may be downloaded to persistent storage 308 through communications unit 312.

I/O interface(s) 314 allows for input and output of data with other devices that may be connected to server 110, computing device 120, and computing device 140. For example, I/O interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., resource management program 112 in server 110, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
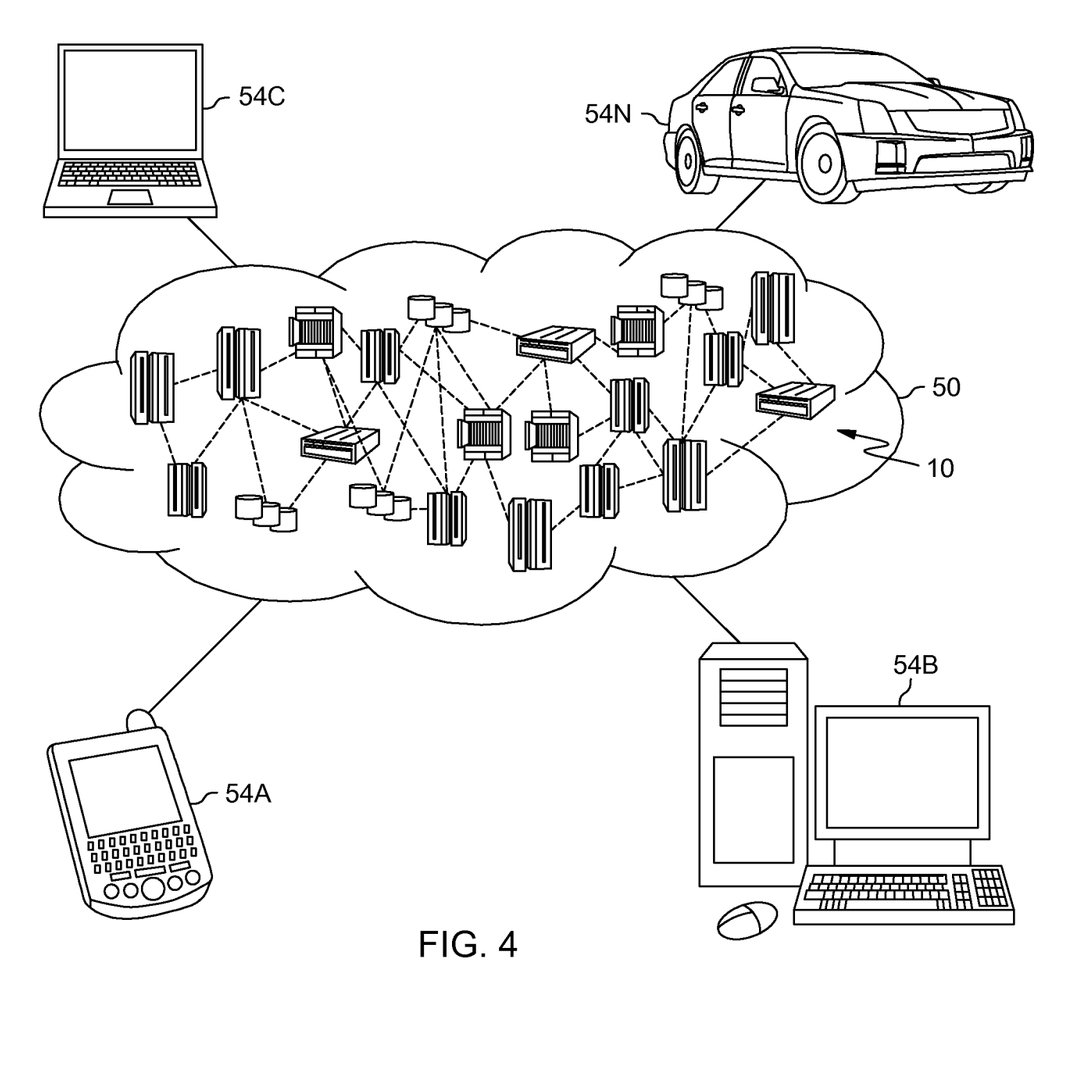
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
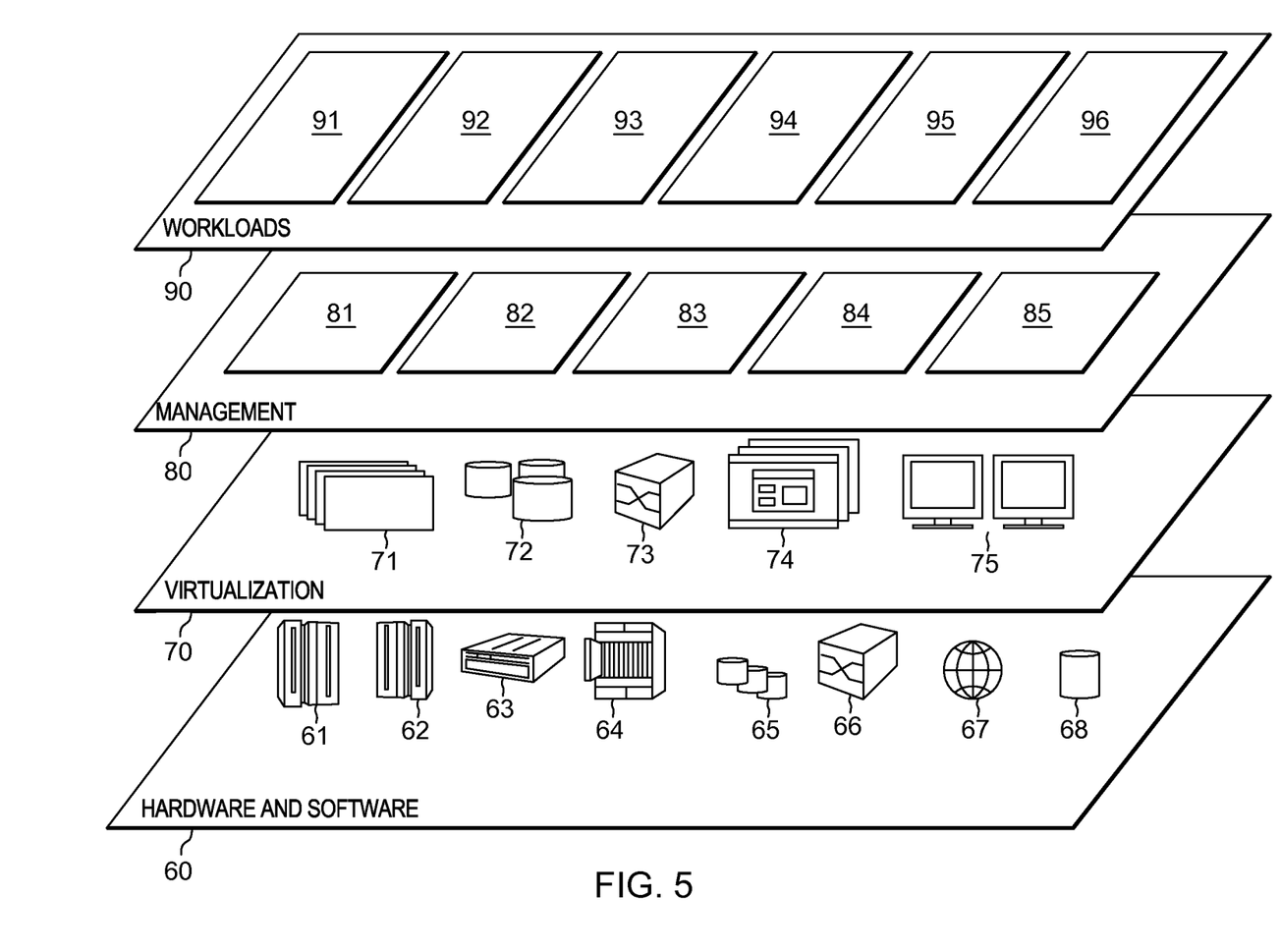
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource management 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing and reallocating computer resources, comprising the steps of:
    a computer creating a prioritization list of a set of project functions, wherein each project function is a computer function based on a specific function of a computer, and wherein the created prioritization list comprises resource management information associated with each project function including an amount of one or more computer resources that are being utilized by each specific function, a priority level assigned to each specific function to distinguish priority of one type of computer function over another type of computer function, and a usage cost associated with each specific function;
    the computer detecting a request for the one or more computer resources for a requesting computer project function, wherein the request further includes a request to do one or more of alter one or more project functions of the set of project functions, add one or more project functions to the set of project functions, and remove one or more project functions from the set of project functions;
    the computer determining whether to allow the request for the requesting computer project function based on a comparison of the priority level and the resource management information of the one or more project functions on the prioritization list to one or more of the resource management information associated with the requesting computer project function and one or more additional factors, wherein the one or more additional factors comprise a determination of complications arising from stopping or changing the one or more project functions; and
    in response to determining that one or more of the resource management information of the requesting computer project function is not higher than at least one of the resource management information of the one or more computer project functions associated with the prioritization list, the computer generating a prompt for allowing the request for the one or more computer resources.

2. The method of claim 1, wherein the step of determining whether to allow the request based on at least a comparison to the prioritization list further comprises:
    the computer determining whether one or more project functions of the set of project functions have an associated priority level that is lower than a priority level associated with the request;
    the computer determining whether at least one of the one or more project functions have any associated throwaway fees, wherein throwaway fees include one or more of startup fees and shutdown fees.

3. The method of claim 2, further comprising:
    responsive to determining that the one or more project functions have an associated priority level that is lower than a priority level associated with the request, and determining that at least one of the one or more project functions do not have any associated throwaway fees, the computer determining whether the at least one of the one or more project functions have an associated amount of resources that is at least equal to an amount of resources associated with the request; and
    responsive to determining that the at least one of the one or more project functions have an associated amount of resources that is at least equal to an amount of resources associated with the request, the computer reducing the amount of resources associated with the at least one of the one or more project functions by an amount equal to the amount of resources associated with the request, and allowing the request.

4. The method of claim 2, further comprising:
    based on determining that the one or more project functions have an associated priority level that is lower than a priority level associated with the request, and determining that at least one of the one or more project functions do not have any associated throwaway fees, the computer determining whether the at least one of the one or more project functions have an associated amount of resources that is at least equal to an amount of resources associated with the request; and
    responsive to determining that the at least one of the one or more project functions have an associated amount of resources that is not at least equal to an amount of resources associated with the request:
        the computer determining a group of project functions of the one or more project functions based on priority level and minimization of throwaway fees, wherein the group of project functions includes the at least one of the one or more project functions; and the computer reducing an amount of resources associated with the group of project functions by an amount equal to the amount of resources associated with the request, and allowing the request.

5. The method of claim 4, wherein the step of the computer determining a group of project functions of the one or more project functions based on priority level and minimization of throwaway fees is further based on minimization of shutdown fees.

6. The method of claim 1, wherein an amount of resources associated with the request exceeds a threshold, the method further comprising:

the computer determining whether one or more project functions of the set of project functions have an associated priority level that is lower than a priority level associated with the request;

the computer determining whether at least one of the one or more project functions have any associated throwaway fees, wherein throwaway fees include one or more of startup fees and shutdown fees;

responsive to determining that the one or more project functions have an associated priority level that is lower than a priority level associated with the request, and determining that at least one of the one or more project functions do not have any associated throwaway fees:

the computer allocating, at a first time period, a first portion of the amount of resources associated with the request for utilization by one or more project functions associated with the request; and the computer allocating, at a second time period, a second portion of the amount of resources associated with the request for utilization by one or more project functions associated with the request.

7. The method of claim 1, wherein an amount of resources associated with the request exceeds a threshold, the method further comprising:

the computer determining whether one or more project functions of the set of project functions have an associated priority level that is lower than a priority level associated with the request;

the computer determining whether at least one of the one or more project functions have any associated throwaway fees, wherein throwaway fees include one or more of startup fees and shutdown fees;

responsive to determining that the one or more project functions have an associated priority level that is lower than a priority level associated with the request, and determining that at least one of the one or more project functions do not have any associated throwaway fees, the computer delaying approval of the request for a period of time.

8. A computer program product for managing computer resources, the computer program product comprising:

one or more computer-readable storage devices and program instructions stored on at least one of the one or more computer-readable storage devices, the program instructions comprising:

program instructions to create a prioritization list of a set of project functions, wherein each project function is a computer function based on a specific function of a computer, and wherein the created prioritization list comprises resource management information associated with each project function including an amount of one or more computer resources that are being utilized by each specific function, a priority level assigned to each specific function to distinguish priority of one type of computer function over another type of computer function, and a usage cost associated with each specific function;

program instructions to detect a request for the one or more computer resources for a requesting computer project function, wherein the request further includes a request to do one or more of alter one or more project functions of the set of project functions, add one or more project functions to the set of project functions, and remove one or more project functions from the set of project functions;

program instructions to determine whether to allow the request for the requesting computer project function based on a comparison of the priority level and the resource management information of the one or more project functions on the prioritization list to one or more of the resource management information associated with the requesting computer project function and one or more additional factors, wherein the one or more additional factors comprise a determination of complications arising from stopping or changing the one or more project functions;

program instructions to, in response to determining that one or more of the resource management information of the requesting computer project function is not higher than at least one of the resource management information of the one or more computer project functions associated with the prioritization list, the computer generating a prompt for allowing the request for the one or more computer resources.

9. The computer program product of claim 8, wherein the program instructions to determine whether to allow the request based on at least a comparison to the prioritization list further comprises:

program instructions to determine whether one or more project functions of the set of project functions have an associated priority level that is lower than a priority level associated with the request;

program instructions to determine whether at least one of the one or more project functions have any associated throwaway fees, wherein throwaway fees include one or more of startup fees and shutdown fees.

10. The computer program product of claim 9, further comprising:

responsive to determining that the one or more project functions have an associated priority level that is lower than a priority level associated with the request, and determining that at least one of the one or more project functions do not have any associated throwaway fees, program instructions to determine whether the at least one of the one or more project functions have an associated amount of resources that is at least equal to an amount of resources associated with the request; and responsive to determining that the at least one of the one or more project functions have an associated amount of resources that is at least equal to an amount of resources associated with the request, program instructions to reduce the amount of resources associated with the at least one of the one or more project functions by an amount equal to the amount of resources associated with the request, and allow the request.

11. The computer program product of claim 9, further comprising:

based on determining that the one or more project functions have an associated priority level that is lower than a priority level associated with the request, and determining that at least one of the one or more project functions do not have any associated throwaway fees, program instructions to determine whether the at least one of the one or more project functions have an associated amount of resources that is at least equal to an amount of resources associated with the request; and responsive to determining that the at least one of the one or more project functions have an associated amount of resources that is not at least equal to an amount of resources associated with the request:

program instructions to determine a group of project functions of the one or more project functions based on priority level and minimization of throwaway fees, wherein the group of project functions includes the at least one of the one or more project functions; and     program instructions to reduce an amount of resources associated with the group of project functions by an amount equal to the amount of resources associated with the request, and allow the request.

12. The computer program product of claim 11, wherein the program instructions to determine a group of project functions of the one or more project functions based on priority level and minimization of throwaway fees is further based on minimization of shutdown fees.

13. The computer program product of claim 8, wherein an amount of resources associated with the request exceeds a threshold, the computer program product further comprising:

program instructions to determine whether one or more project functions of the set of project functions have an associated priority level that is lower than a priority level associated with the request;

program instructions to determine whether at least one of the one or more project functions have any associated throwaway fees, wherein throwaway fees include one or more of startup fees and shutdown fees;

program instructions to determine that the one or more project functions have an associated priority level that is lower than a priority level associated with the request, and program instructions to determine that at least one of the one or more project functions do not have any associated throwaway fees:

program instructions to allocate, at a first time period, a first portion of the amount of resources associated with the request for utilization by one or more project functions associated with the request; and         program instructions to allocate, at a second time period, a second portion of the amount of resources associated with the request for utilization by one or more project functions associated with the request.

14. The computer program product of claim 8, wherein an amount of resources associated with the request exceeds a threshold, the computer program product further comprising:

program instructions to determine whether one or more project functions of the set of project functions have an associated priority level that is lower than a priority level associated with the request;

program instructions to determine whether at least one of the one or more project functions have any associated throwaway fees, wherein throwaway fees include one or more of startup fees and shutdown fees;

responsive to determining that the one or more project functions have an associated priority level that is lower than a priority level associated with the request, and determining that at least one of the one or more project functions do not have any associated throwaway fees, program instructions to delay approval of the request for a period of time.

15. A computer system for managing computer resources, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:

program instructions to create a prioritization list of a set of project functions, wherein each project function is a computer function based on a specific function of a computer, and wherein the created prioritization list comprises resource management information associated with each project function including an amount of one or more computer resources that are being utilized by each specific function, a priority level assigned to each specific function to distinguish priority of one type of computer function over another type of computer function, and a usage cost associated with each specific function;

program instructions to detect a request for the one or more computer resources for a requesting computer project function, wherein the request further includes a request to do one or more of alter one or more project functions of the set of project functions, add one or more project functions to the set of project functions, and remove one or more project functions from the set of project functions;

program instructions to determine whether to allow the request for the requesting computer project function based on a comparison of the priority level and the resource management information of the one or more project functions on the prioritization list to one or more of the resource management information associated with the requesting computer project function and one or more additional factors, wherein the one or more additional factors comprise a determination of complications arising from stopping or changing the one or more project functions;

program instructions to, in response to determining that one or more of the resource management information of the requesting computer project function is not higher than at least one of the resource management information of the one or more computer project functions associated with the prioritization list, the computer generating a prompt for allowing the request for the one or more computer resources.

16. The computer system of claim 15, wherein the program instructions to determine whether to allow the request based on at least a comparison to the prioritization list further comprises:

program instructions to determine whether one or more project functions of the set of project functions have an associated priority level that is lower than a priority level associated with the request;

program instructions to determine whether at least one of the one or more project functions have any associated throwaway fees, wherein throwaway fees include one or more of startup fees and shutdown fees.

17. The computer system of claim 16, further comprising:

responsive to determining that the one or more project functions have an associated priority level that is lower than a priority level associated with the request, and determining that at least one of the one or more project functions do not have any associated throwaway fees, program instructions to determine whether the at least one of the one or more project functions have an associated amount of resources that is at least equal to an amount of resources associated with the request; and responsive to determining that the at least one of the one or more project functions have an associated amount of resources that is at least equal to an amount of resources associated with the request, program instructions to reduce the amount of resources associated with the at least one of the one or more project functions by an amount equal to the amount of resources associated with the request, and allow the request.

18. The computer system of claim 16, further comprising: based on determining that the one or more project functions have an associated priority level that is lower than a priority level associated with the request, and determining that at least one of the one or more project functions do not have any associated throwaway fees, program instructions to determine whether the at least one of the one or more project functions have an associated amount of resources that is at least equal to an amount of resources associated with the request; and responsive to determining that the at least one of the one or more project functions have an associated amount of resources that is not at least equal to an amount of resources associated with the request:
 program instructions to determine a group of project functions of the one or more project functions based on priority level and minimization of throwaway fees, wherein the group of project functions includes the at least one of the one or more project functions; and
 program instructions to reduce an amount of resources associated with the group of project functions by an amount equal to the amount of resources associated with the request, and allow the request.

19. The computer system of claim 18, wherein an amount of resources associated with the request exceeds a threshold, the computer program product further comprising:
 program instructions to determine whether one or more project functions of the set of project functions have an associated priority level that is lower than a priority level associated with the request;
 program instructions to determine whether at least one of the one or more project functions have any associated throwaway fees, wherein throwaway fees include one or more of startup fees and shutdown fees;
 program instructions to determine that the one or more project functions have an associated priority level that is lower than a priority level associated with the request, and program instructions to determine that at least one of the one or more project functions do not have any associated throwaway fees:
  program instructions to allocate, at a first time period, a first portion of the amount of resources associated with the request for utilization by one or more project functions associated with the request; and
  program instructions to allocate, at a second time period, a second portion of the amount of resources associated with the request for utilization by one or more project functions associated with the request.

20. The computer system of claim 15, wherein an amount of resources associated with the request exceeds a threshold, the computer program product further comprising:
 program instructions to determine whether one or more project functions of the set of project functions have an associated priority level that is lower than a priority level associated with the request;
 program instructions to determine whether at least one of the one or more project functions have any associated throwaway fees, wherein throwaway fees include one or more of startup fees and shutdown fees;
 responsive to determining that the one or more project functions have an associated priority level that is lower than a priority level associated with the request, and determining that at least one of the one or more project functions do not have any associated throwaway fees, program instructions to delay approval of the request for a period of time.

* * * * *